United States Patent [19]

Heule

[11] Patent Number: 4,844,670

[45] Date of Patent: Jul. 4, 1989

[54] CUTTER FOR THE DEBURRING OF BORES

[76] Inventor: Heinrich Heule, Balgach, Switzerland, 9436

[21] Appl. No.: 102,986

[22] Filed: Sep. 30, 1987

[30] Foreign Application Priority Data

May 21, 1987 [DE] Fed. Rep. of Germany ....... 3717135
Jun. 4, 1987 [DE] Fed. Rep. of Germany ....... 3718731

[51] Int. Cl.$^4$ ...................... B23B 51/00; B23D 77/00
[52] U.S. Cl. ........................................ 408/224; 407/9; 408/227; 408/714
[58] Field of Search ............... 408/186, 223, 224, 227, 408/228, 239 R, 713, 714; 407/9

[56] References Cited

U.S. PATENT DOCUMENTS 3,345,888 10/1967 Gustkey ............................. 408/714
3,973,861 8/1976 Sussmuth ............................ 408/714

Primary Examiner—Rodney B. Bovernick
Assistant Examiner—J. P. Ryan
Attorney, Agent, or Firm—Skjerven, Morrill, MacPherson, Franklin & Friel

[57] ABSTRACT

A cutter for the deburring of bores comprises a rectangular edged cutter element having taperingly extending cutting edges, having clearance surfaces ground undercut and comprising a convexly ground contact surface on one end of the cutter head for contact with the internal surface of a bore. Two oppositely aligned cutter elements are mounted for displacement in a radial direction in a guide recess of a tool holder, and while in the operative position during the deburring of a bore, the cutting elements are displaced inwards radially because of the tool holder feed and because of the tapered extension of the cutting edges, against a spring force in the guide recess, until they finally reach the inner area of the bore in the non-cutting mode. To prevent damage to completed stages or to the inner surface of a bore during the continuation of the operation, a rake surface with a curvelinear bevel forms a clearance angle behind the cutting edge, which clearance disappears at the end of the operation as the contact surface comes into contact with the inner surface of the bore.

5 Claims, 3 Drawing Sheets

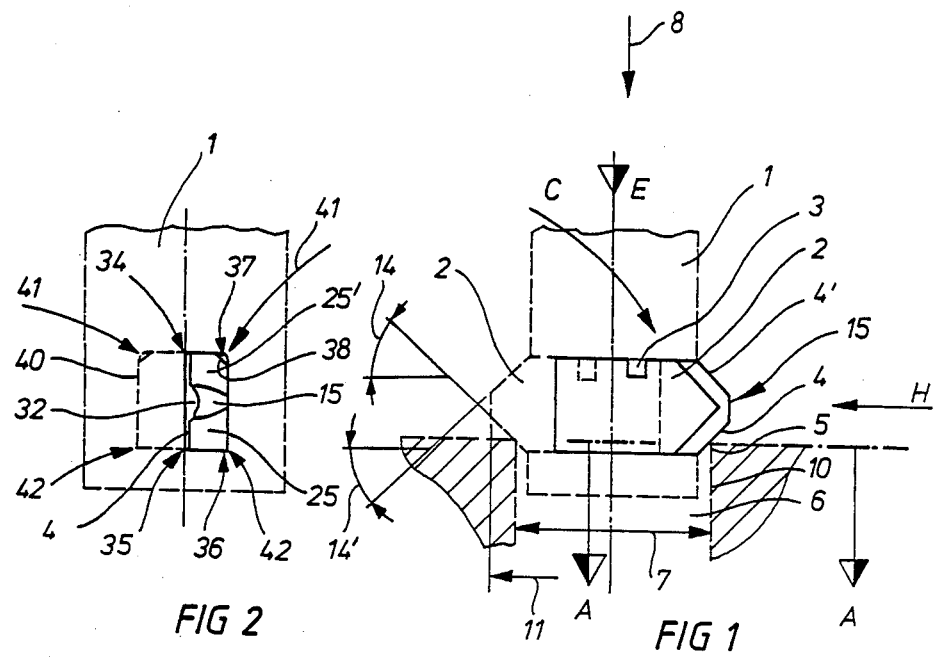
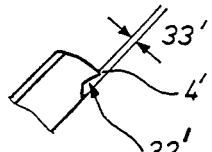
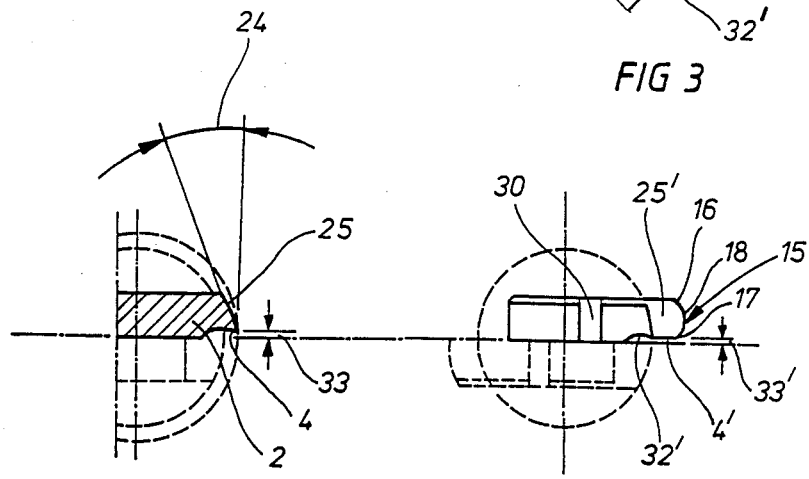

CUTTER FOR THE DEBURRING OF BORES

BACKGROUND OF THE INVENTION

1. Field of the Invention

The invention relates to a cutter for the deburring of bores, comprising a rectangular edged cutting element having taperingly extending cutting edges, having rakes ground with back taper and an end contact surface on the cutter head intended to be placed in contact on the inner surface of a bore.

2. Description of the Prior Art

Cutters of this nature intended for the deburring of bores are preferably utilised in pairs, the cutting blades comprising radially outwardly turned tapered cutting edges installed in a rectangular reception slot in a rotationally driven tool holder. The cutting blades are thrust outwards via pins on a shaft by means of a spring situated within the tool holder, the pins each engaging in a groove of the cutter elements. According to German Pat. No. 2,649,208, the cutting blades are equidirectionally displaceable. The cutting blades in the inoperative position thus protrude radially outwardly under spring force. In the operative position during the deburring of a bore, the cutting blades are progressively displaced inwards against the spring force as the tool holder is fed in, because of the tapered extension of the cutting edges in the case of bevelling bore edges, until they finally reach the inner area of the bore whilst in rotary motion.

The tool holder is then displaced together with the cutting blades through the bore so that it may process the rear bore edge during the return working feed.

The cutting blades furthermore have another cutting edge on an opposing side, so that following the traversal of the bore, the rim of the bore may be deburred and chamfered during the same cutting sequence but in another feed direction, from behind.

In this connection, it is disadvantageous in the case of such known cutters that the chamfer just produced, and also the inner surface of the bore within its internal volume, may be damaged upon terminating the processing operation during continued inward radial displacement of the cutting blades or cutters for traversal of the bore.

In a known cutter, the cutter blades may easily be jammed in the tool holder by swarf penetrating into the blade guide, thus damaging the inner surface of the bore during traversal of a bore for the purpose of deburring the rear side. The risk also arises in the case of the known cutter that it can be wrongly inserted in the tool holder, making the tool unserviceable for operation and cutting or damaging the bore.

BRIEF SUMMARY OF THE INVENTION

It is an object of the present invention to construct a cutter of the kind described above, in such a way that damage to completed chamfers or the like, or damage to the inner surface of a bore as the operation proceeds, is prevented.

This object is achieved in accordance with the invention in that the rakes comprise a curvilinear bevel whilst forming a clearance angle disappearing at the end of the processing operation, and that the contact surface at the end is ground convexly.

An important feature of the invention is that while effective cutting means are provided on the cutter, protective surfaces and curvilinear chamfer surfaces are simultaneously also provided, in the vicinity of the cutting means to be guided, without risk to the chamfers produced or to the internal area of a bore which is not to be processed.

Upon forming a chamfer at the bore rim, the cutting blade initially bears in a cutting mode on the bore rim, because an effective clearance angle is provided in this radial area of the cutter on the rake or clearance surface of the cutting edge in the manner of a relief. As the operation continues, the cutter is progressively displaced inwards radially into the tool holder, until the cutter bears with its rake on the chamfer produced. The clearance angle disappears in this area, i.e. it merges into a zero region so that the cutter is available without its cutting function and rests with its rake on the chamfer. During the continued feed, the cutter may now be displaced inwards radially over the chamfer without risk to the chamfer produced, into the blade guide, to allow traversal of the bore and to debur the bore even from the rear, in the opposite direction of feed. As far as this goes, a deleterious secondary burr or fin is prevented on the chamfer produced, during continued radial displacement of the cutting edge.

Upon passing the cutters into the bore, the inner surface of the bore is protected against the ends of the rotating cutting edges, because the end of the cutter head has a convexly ground form. Sensitive bores, e.g. bores having a high surface quality, bores in plastics materials and in particular all other easily chippable materials, may now also be deburred in a particularly advantageous manner.

According to a further feature of the invention, the cutting edges of the chip grooves are arranged set back by an amount such as to overbridge accretion cutting edges. The term "accretion cutting edge" is intended to denote a particular effect of wear on the cutter, in particular on the cutting edges, because the cutting edges wear down not only during chip-raising machining, i.e. being worn down, but a certain degree of accretion also occurs by cold welding or deposition of worn off material. The cutting edge is thus built up with this material and this accretion effect is now neutralised by means of the inventive cutter geometry, in that according to the invention the unavoidable build-up operation does not result in functional unserviceability of the tool. To this end, the cutting edge and the chip groove are set back by a specific amount, so that swarf or chips may be deposited without risk in the area. If this set-back area were absent, the blade would fit precisely in the blade guide on the tool head, without an interstice being present. In this case, an accumulation of worn-off material on the cutting edge of the blade would lead to unserviceability of the tool after a comparatively brief period, because this material accumulated on the cutting edge of the blade could prevent the radial displacement of this cutter, whereby the inner surface of a bore could be damage, for example. Thanks to this set-back arrangement, it is now possible to allow a certain degree of accretion for the cutting edge without thereby making the tool unserviceable. The functionality of this cutter is thereby assured even over a protracted period and more particularly damage caused by seizing of the cutter is prevented.

According to a further feature of the invention the edges of the cutting member may be acutely formed as solid or plain edges, one edge having a longitudinal chamfer in a facet-like configuration, and the blade guide on the tool holder may in each case be provided with a radius in the region of the longitudinal chamfers of the cutting elements.

In this way, the blades may now be inserted in the tool head in the correct position only, thereby preventing damage to surfaces which are not to be machined. On the other hand, the cutting blades may be drawn in or extended in radial direction without seizing or catching.

Further objects and features of the invention will become apparent from the following detailed description when read with reference to the accompanying drawings which illustrate a preferred embodiment thereof.

BRIEF DESCRIPTION OF THE DRAWINGS.

FIG. 1 shows a cutter according to the invention at the start of the machining operation, being offered up to a bore rim which is to be machined.

FIG. 2 shows a view in a direction of arrow H in FIG. 1;

FIG. 3 shows a view in the direction of arrow C in FIG. 1;

FIG. 4 shows a section along the line A—A in FIG. 1;

FIG. 5 shows a view in the direction of arrow E in FIG. 1;

Figure 6:
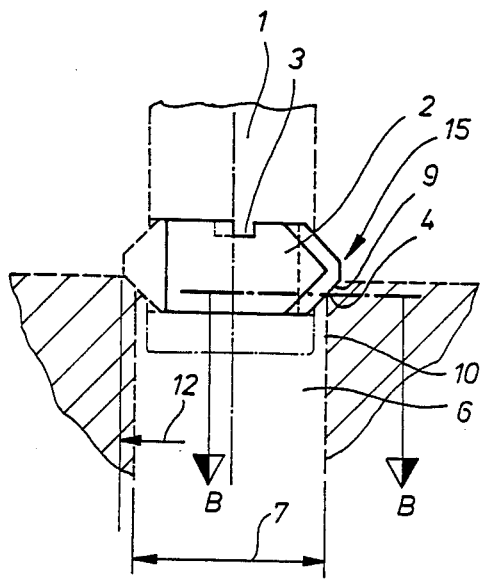
FIG. 6 shows the cutters according to FIG. 1 at the end of the machining operation.

DETAILED DESCRIPTION OF THE PREFERRED EMBODIMENT.

In the drawings the positioned references drawn in broken lines apply to the chamfering displacement in reverse, and the positional references drawn in unbroken lines apply to forwardly directed chamfering displacement.

In FIG. 1 is illustrated a tool holder 1 comprising cutting blades 2 arranged in pairs, which are thrust outwards in a radial direction under the spring force of a spring (not illustrated). To this end, entraining pins 3 are provided, which engages in grooves 30 of the cutting blades 2 under rotary displacement, and thrust the same outwards radially under spring force. During effective feed, the cutting blades 2 may be drawn radially inwards, against the spring thrust.

One cutting blade only is described in the following in each case, since the cutting blades are provided in pairs.

According to FIG. 1, a cutting blade 2 is shown in its maximum extended position with the radius 11 at the beginning of the machining operation. To this end the cutting edge 4 is situated, during a rotary displacement of the tool holder 1, on a rim 5—which is to be machined—of a bore 6 having a diameter 7 and an inner surface 10. To machine the rim 5, the tool holder 1 is lowered with the rotating cutter 4 in the direction of the arrow 8, in the direction of feed.

In FIG. 6 is illustrated the end of the machining operation with the forming of a chamfer 9.

Figure 8:
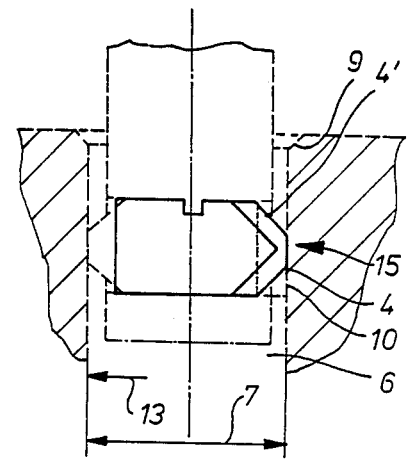
FIG. 8 shows the cutters of FIGS. 1 to 7 passing through the inner portion of a bore.

FIG. 8 finally shows the continued entrainment of the rotating cutting edges 4 into the inner region of the bore 6.

Because of the feed displacement in the direction of the arrow 8 and of the tapering chamfer of the cutting edge 4 corresponding to the angle 14 according to FIG. 1, the cutting blades are gradually displaced inwards radially against the action of a spring, initially starting from the radius 11 shown in FIG. 1, then with the radius 12 shown in FIG. 6 after completion of the machining operation, until upon insertion into the bore 6, the cutting blades 2 assume the radius 13 in corresponding to the internal diameter 7 of the bore 6.

The cutter of the invention is intended to deburr or chamfer, respectively, the rim of the bore in the feed and reverse directions, and in particular to prevent damage to the internal region of the bore 6 shown in FIG. 8, especially at the end of the machining operation as shown in FIG. 6 during the transfer into the internal region of the bore 6.

In this connection, the invention provides that the rakes 25 have a curvilinear chamfer whilst forming a clearance angle 24 diminishes to nothing at the end of the machining operation and that the end contact surface 15 is ground too a convex shape.

Figure 7:
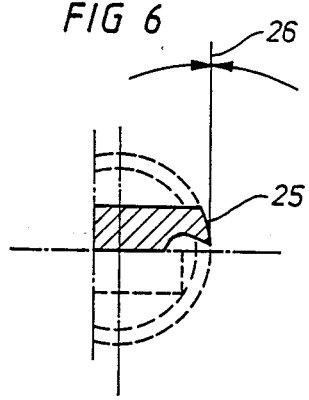
FIG. 7 shows a section along the line B—B in FIG. 6.

The evolution of the clearance angle 24 in the course of the processing operation is depicted in particular in FIGS. 4 and 7.

At the beginning of the machining operation shown in FIG. 1, an effective clearance angle 24 is formed behind the cutting edge 4, which causes advantageous cutting of the material which is to be processed.

The clearance angle 24 gradually diminishes in the course of the machining action, until it finally disappears as shown in FIG. 7 at the end of the machining action of FIG. 6, i.e. the clearance angle 24 changes to a zero value 26. The cutting edge 4 thereupon merely bears under thrust but without cutting on the chamfer 9 just produced. From this point onward, the cutting edge 4 may be subjected to continued feed without a risk of undesirable further machining of the chamfer 9. To this end, the cutting edge slides inwards radially over the chamfer 9, and finally reaches the internal region of the bore 6 whilst constantly being thrust outwards under spring unloading.

Figure 9:
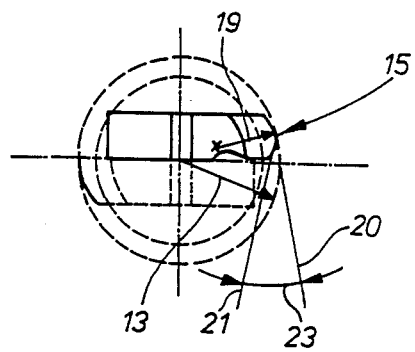
FIG. 9 shows the tangential extension of the sliding surface on the end of a cutter by comparison to the tangential extension of the inner surface of the bore and FIG. 10 shows in perspective a cutter according to the invention.

Damage to the internal surface 10 is prevented within this bore 6, because as shown in FIGS. 5 and 9, the end side of the cutter head is ground convexly, i.e. the outer contact surface 15 is formed as a sliding surface.

To this end, the contact surface 15 forms a linear sliding surface on the inner surface 10 of the bore 6 as shown in FIG. 8, so that damage is precluded for this reason. The contact surface 15 is arranged in convex form as shown in FIG. 5, i.e. having front and rear surfaces 16,17 set back with respect to a prominent central surface 18. The contact surface 15 is tapered back with respect to the cutting edge 4, i.e. the rear surface 16 is inwardly displaced wiht respect to the front surface 17. The end contact surface 15 forms a negative angle 23 in the cutting direction, depending on the size of the cutter. A noncutting contact of the cutter head on the internal surface 10 of the bore 6 is thus obtained.

The end contact surface 15 is formed as a sliding surface and has a sliding radius 19 directed outwardly with respect to the centre of the longitudinal and transverse axes of the tool, which is smaller than the radius 13 of the bore 6 which is to be machined. The radius 19 of the convex contact surface is always smaller as shown in FIG. 9 than the radius 13 of a bore which is to be traversed. It is constantly ensured thereby that no further cutting occurs during the continued lowering of the cutter head in the region of the internal surface 10 of the bore 6.

The tangent 20 to the rim of the bore subtends an angle 23 with the tangent 21 to the convex contact surface 15 as shown in FIG. 9, so that a cutting action by the end surface of the cutter head may be prevented.

Figure 10:
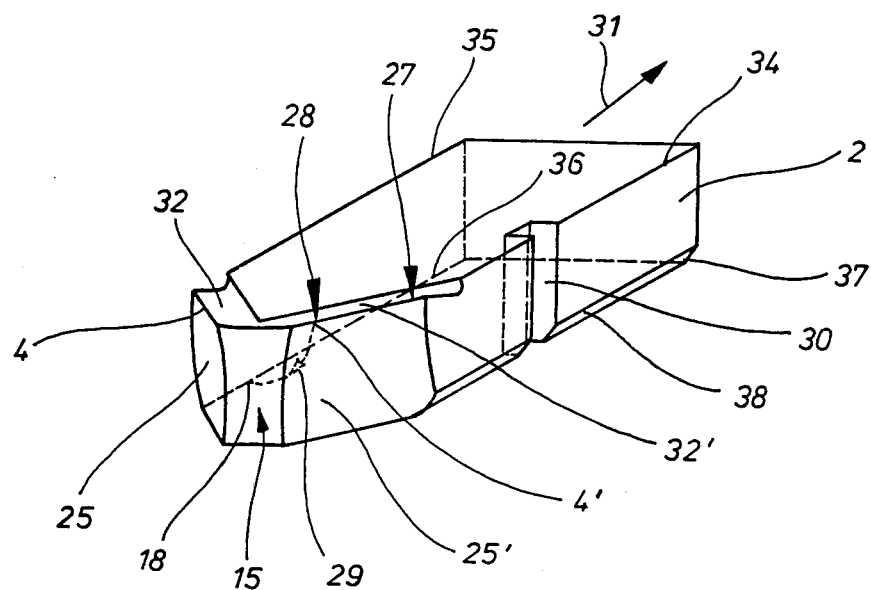

The co-operation of the rakes, 25' in conjunction with the convexly formed contact surface 15 is depicted in particular in FIG. 10 under reference to a reverse cutting operation.

The optimum cutting action of the cutting edge 4 is operative between the arrows 27,28 in the operating range of the cutting blade 2, corresponding to a clearance angle 24 shown in FIG. 4, to produce a chamfer 9. As soon as the cutter 2 then engages more deeply into the bore 6 than is shown in FIG. 6, because of the feed and against the direction of the arrow 8 during a chamfering operation in reverse, the sliding radius 9 shown in FIG. 9 is brought to bear on the contact surface 15. From the arrow 28 at the cutting edge 4', the contact point of the cutter on the chamfer 9 describes an arcuate displacement in the direction of the arrow 29, up to the central surface 18 on the contact or sliding surface 15. This arcuate curve in the direction of the arrow 29 on the rake 25' (FIG. 10) ensures that the chamfer 9 produced is itself no longer being damaged. The cutting operation will thereby be terminated when the contact point reaches the position 18 corresponding to the end of the machining operation of FIG. 6. The cutter 2 is concomitantly moved radially inwards in contact with the contact surfaces in the region of an arcuate curve in the direction of the arrow 31 until the cutting edge bears in an inactive mode against the surface 18 of the contact surface 15 on the internal surface 10 of the bore 6 in the internal region of the bore 6.

It is ensured thereby that during the radial displacement of the cutters 2 into the bore 6, the chamfer 9 itself will no longer be cut by the cutters 2.

The transition from the cutting edge 4' from the point 28 to the point 18 or rather to the central surface 18 consequently occurs via the rake 25', in the form of this arcuate curve, in the direction of the arrow 29.

This change from the cutting operation to the inactive contact surface of sliding surface 15, i.e. to the end of the cutter head, is also apparent from FIG. 4 which shows that cutting is still performed at the angle 24, whereas in FIG. 7 the angle 24 reduces to a zero value as shown at 26 at which there is no longer any cutting action.

An optimum cutting action is thereby obtained as a result, between the arrows 27,28 in FIG. 10.

All bore diameters lying witin the tool size range may thereby be deburred or chamfered in one operation by means of one tool.

It is apparent from FIGS. 1,6 and 8 that the cutter 2 is utilised to form chamfers or for deburring the edges of bores. Under increasing inward radially displacement, the clearance angle 24 finally shrinks to its zero value 26, whereby the cutter loses its cutting capacity and may consequently be inserted into the internal region of the bore 6 without any cutting action thereon.

The cutter may moreover also be displaced through the bore without developing a cutting action, because the end surface of the cutter head is furthermore formed as a protective surface.

As shown in FIGS. 3 and 5, the cutting edges 4' of the chip groove 32' are set back by an amount 33'. Material may thereby by accumulated on the cutting edge 4' without thereby impeding the radial displacement of the cutter 2 in the tool head or in its blade guide 40. Chips are bent over and broken off by the chip groove 32' after a specific length is reached, thereby preventing excessively long chips from penetrating into and below the cutters, which could block the cutters and render the tool unusable. Damage to chamfers or to the inner surfaces of bores is thereby already prevented even in the absence of further development of the cutters.

It is apparent from FIG. 2 and 10 that the longitudinal edges 34,35,36,37 of the cutter element 2 are formed as solid angled edges, one edge 37 having a longitudinal chamfer 38 in facet-like form, and the blade guide being provided in each case with a radius 41 on the tool holder 1 in the area of the longitudinal chamfer 38. The cutters 2 may thereby be inserted in the blade guide 40 in the tool holder 1 in the correct position only, thereby assuring its functionality and cutting capacity. Two sharp corners 42 are present on the tool holder 1 and two rounded off radii 41 are oppositely situated in the area of the blade receiver or rather in the area of the blade guide 40, where the blades are inserted with the longitudinal chamfers 38 in the correct position. The cutters 2 may thus be inserted in the correct position only.

What is claimed is:

1. A cutting element for the deburring of a bore, said element comprising a rectangular body having an outer forward end and at least one pair of cutting edges tapering inwardly from said forward end, said cutting edges in a cutting mode having a diameter greater than said bore, raked surfaces adjoining said cutting edges and extending rearwardly therefrom and a contact surface on said forward end between said raked surfaces, wherein said raked surfaces are rearwardly curved, the curvature increasing in a direction away from said contact surface whereby a clearance angle is formed behind each said cutting edge when said edge engages a cylindrical bore at a position spaced from said contact surface, which clearance angle reduces to zero as siad cutting element moves towards and reaches an internal surface of said bore, and wherein said contact surface is ground to a convex shape.

2. A cutter as claimed in claim 1, wherein said contact surface forms a curved sliding surface directed outwardly with respect to the centre of the longitudinal and transverse axis of the tool, to engage said internal surface of a cylindrical bore, said curved surface having a radius which is smaller than the radius of said bore which said cutter is dimensioned to machine.

3. A cutter as claimed in claim 2 wherein said contact surface has a negative angle ground thereon in the direction of cutting.

4. A cutter for the deburring of bores, comprising a rectangular edged cutting element situated in a guide recess of a tool holder wherein said cutting element is formed with longitudinal angled edges, one of said edges having a longitudinal chamfer in a facet-like arrangement and wherein said guide recess in the tool holder is provided with a radiused corner shaped to accommodate only said edge with the longitudinal chamfer.

5. A cutter element for deburring a cylindrical bore, comprising an elongate cutter body having major and minor side surfaces and a forward end shaped for cutting, and having a substantially rectangular cross-section;
- a contact surface at said forward end, ground to a convex shape;
- at least one raked surface extending obliquely between said contact surface and one said minor side surface; a cutting edge extending between a corner of said contact surface and a corner of said minor side surface, defining an edge of said raked surface adjoining one said major side surfaces and
- a chip groove formed in said major side surface behind and alongside said cutting edge,
- wherein said rake surface curves rearwardly in a direction away from said cutting edge and away from said contact surface to form a clearance angle behind said cutting edge between said cutter body and the edge of a cylindrical bore being machined, which clearance angle reduces to zero as said cutter body moves into said bore.

* * * * *